March 21, 1950     L. C. CARTWRIGHT     2,501,496
STERILIZING APPARATUS AND METHOD
Filed May 12, 1945
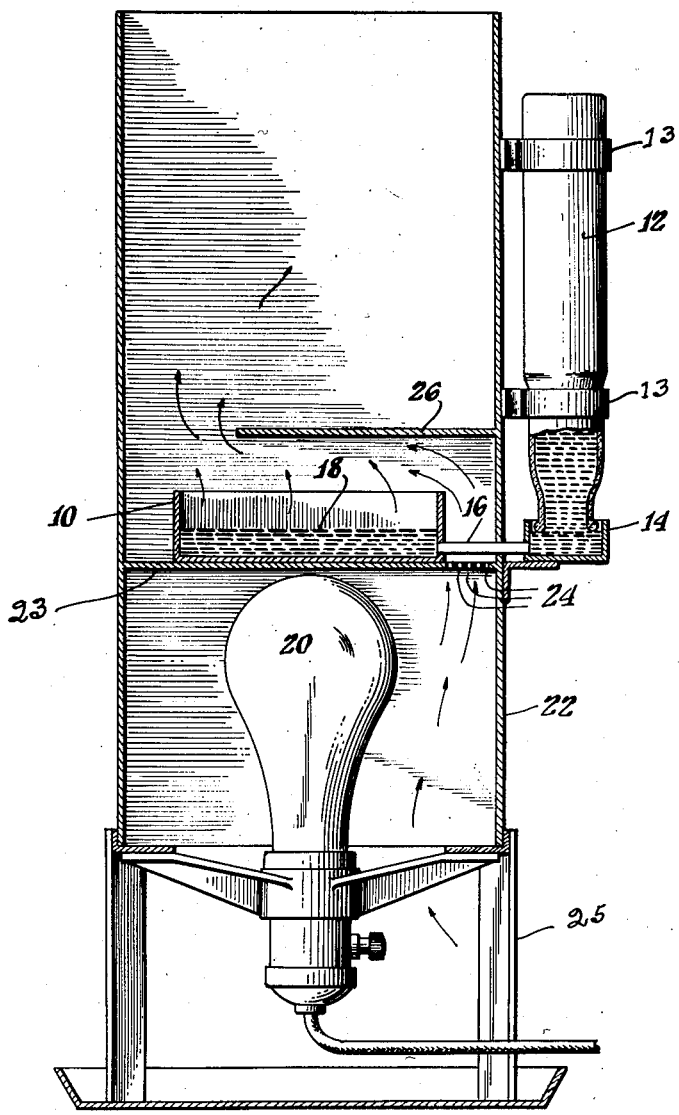
INVENTOR
Leonard C. Cartwright
BY
Robert Calvert
ATTORNEY Patented Mar. 21, 1950

2,501,496

UNITED STATES PATENT OFFICE 2,501,496

STERILIZING APPARATUS AND METHOD

Leonard C. Cartwright, New York, N. Y., assignor to William B. Birnkrant, New York, N. Y.

Application May 12, 1945, Serial No. 593,454

3 Claims. (Cl. 21—53)

This invention relates to an apparatus and method for disinfecting air of rooms containing moisture and bacteria.

There has been extensive study of the use of propylene glycol to disinfect the air in rooms of hospitals and like institutions, to prevent the spread of contagious disease.

The invention is particularly adapted for use use in such disinfection and will therefore be illustrated by description in connection with such use of propylene glycol.

It has been known that propylene glycol in extremely high dilutions in air, say 1 g. of the glycol to 2,000,000 cc. or more of air, is sufficient to kill immediately Staphylococci and other bacteria and thus prevent spread of infection through breathing of air carrying bacteria of kind usually found in hospital rooms. Much more concentrated mixtures of propylene glycol, on the other hand, are ineffective as bactericides when liquid water is present in the propylene glycol. Thus, it has been found that *Staphylococcus aureus*, for instance, will live in an aqueous solution of concentration as high or higher than 1 part of the glycol to 100 parts of water.

The present invention provides a convenient and economical method and apparatus for insuring the contact of infected air with propylene glycol in substantially anhydrous condition and in the absence of liquid water.

Briefly stated, the present invention comprises means for and the method of contacting infected air in warmed condition with propylene glycol in heated, substantially anhydrous form, both the air and the propylene glycol being maintained during this contact at temperatures above the dew point for the moisture contained in the air. In a preferred embodiment, the invention comprises cooling the air after contact with the propylene glycol until the resulting mixture of air and vapor of propylene glycol is practically saturated with respect to the glycol or rich in the glycol in proportion to the maximum that may be held in the air after the cooling.

The invention will be illustrated in greater detail by description in connection with the attached drawing to which reference is made.

The figure in the drawing is a side view of the apparatus, the view being partly in section and partly diagrammatic.

Parts not shown in detail are conventional.

There are shown an open vessel or dish 10 for receiving and holding the supply of propylene glycol, a container such as an inverted bottle 12, with support bands 13 above a basin 14, and duct 16 for delivering the propylene glycol from the basin to the dish and maintaining the glycol at the approximately constant level 18.

Disposed below the dish is a heater which may be an incandescent electric light bulb 20 with usual connections to a source of electric current. This heater is adjacent to and preferably contacts the pan on the bottom thereof.

Disposed around the pan and heater is a chimney 22. The chimney contains a shelf 23 which supports the dish. The shelf is provided with air vents 24 which are in free communication with air inlets through the open base 25 which supports the other parts of the apparatus.

Extending partway across the heater and a short distance above the dish 10 is baffle 26.

In the operation of the sterilizer or disinfecting apparatus, the bottle 12 is supplied with propylene glycol and inverted above the constant level basin 14 so that the liquid rises to the desired level in dish 10. Current is turned on to the electric light heater 20. After the heat is applied for awhile, a stream of air rises by convection as a steady stream through the chimney; the air enters through the bases, passes around and is heated by the heater 20, rises through the vents and is deflected by baffle 26 so that the warmed air comes into contact with the upper exposed surface of the heated propylene glycol in dish 10. As the air continues to rise through the chimney, the air is cooled by radiation and conduction, the extent of the cooling being adjustable by the rate of passage of air through the chimney as affected by the size of openings of the vents, the height and size of chimney above the heater, and thermal conductance of the chimney wall. These factors are suitably so adjusted that the air and propylene glycol vapor cools to the extent that it becomes rich in propylene glycol vapors, as compared to the maximum amount that may be held in the air at the temperature at which the air issues from the top of the chimney and into the hospital room, and may in fact be practically saturated with the vapors of the glycol; droplets of propylene glycol are sometimes seen to form a light fog in the air and vapor mixture flowing from the top of the chimney.

In a typical operation, the rate of passage of air through the chimney was about 17 cu. ft. per min. It may be calculated that in a room of moderate size, say 12 x 10 x 8 feet and containing 960 cu. ft. of air, the total volume of air treated in somewhat less than an hour, with this concentrated vapor of the propylene glycol in anhydrous condition, corresponds to the volume originally present in the room.

Since the electrical heating maintains the propylene glycol in dish 10 at temperatures well above the dew point for moisture, there is no interference with the effectiveness of the propylene glycol from the condensation of water in liquid form, either in the propylene glycol or in the air stream being treated. There is therefore no absorption of moisture from the air by the propylene glycol. In fact, propylene glycol if supplied initially with some water present in it loses the water rapidly at the start of a treatment of the kind described; when the treatment is in regular, smooth operation, the propylene glycol is practically anhydrous that is, free from water, and is vaporized as such into the stream of air.

In a typical operation the dish 10 was a shallow open dish of diameter 4½ in. and height ¾ in. The propylene glycol stood in the dish to a depth of ¼ inch. The electric light heater was a 100 watt bulb, the amount of propylene glycol evaporated was 12 grams an hour and the rate of passage of air through the chimney was 17 cu. ft. a minute.

The chimney itself was a sheet iron cylinder of diameter 6 in. and overall height of 15 in. above the base or support 25.

In this representative run, the temperature at the upper surface of the propylene glycol was 97° C., at which temperature moisture is expelled from the propylene glycol and none can condense from the air.

The resulting mixture of air and propylene glycol vapor was cooled to 28° C. at the outlet at the top of the chimney 22.

The air passing through the sterilizer was practically free of bacteria.

Materials of construction of the various parts may be those that are usual for such parts. Thus the bottle may be of glass, the light 20 and accessories of usual type, and other parts of steel or iron.

Other disinfecting materials of boiling point above that of water but of substantial vapor pressure may be used, as for instance phenol or iodine. Each of these materials however has some practical disadvantage, so that propylene glycol is preferred.

It will be understood also that it is intended to cover all changes and modifications of the example of the invention herein chosen for the purpose of illustration which do not constitute departures from the spirit and scope of the invention.

What is claimed is:

1. In an apparatus for treating with a glycol the air of a room containing moisture and bacteria, the combination of an open dish to receive and hold a supply of the glycol, a chimney disposed around and extending above and below the said dish, provided with an air vent at a level below the said dish, and provided with an outlet for air near the top of the chimney, an open top container for replacement glycol, means mounting the container outside but adjacent to the chimney and at about the level of the said dish, means for delivering a supply of glycol to the said container at a constant level, a delivery tube extending between the said container and dish, and a heater for maintaining the glycol in the dish at an elevated temperature above the dew point of moisture in the air so that there is no substantial absorption of moisture by the glycol, the chimney and heater causing a stream of air to rise around the said dish and over the glycol.

2. The method of treating air in a room which comprises passing the air by thermal convection and in the form of a steady warmed stream against the surface of a heated supply of a disinfectant of boiling point above 100° C. but of substantial vapor pressure at that temperature, maintaining the supply of disinfectant at an elevated temperature above the dew point of moisture in the air in contact with the disinfectant, so that there is no substantial absorption of moisture by the disinfectant, and then cooling the resulting mixture of air and vapor of the disinfectant.

3. In an apparatus for treating with a glycol the air of a room containing moisture and bacteria, the combination of an open dish to receive and hold a supply of the glycol, a chimney disposed around and extending above and below the said dish, provided with an air vent at a level below the said dish, and provided with an outlet for air near the top of the chimney, a baffle disposed within the said chimney and above but near to the level of the glycol in the said dish, for deflecting the said stream of air upon the upper surface of the glycol, and a heater for maintaining the glycol in the dish at an elevated temperature above the dew point of moisture in the air so that there is no substantial absorption of moisture by the glycol, the chimney and heater causing a stream of air to rise around the said dish and over the glycol.

LEONARD C. CARTWRIGHT.

REFERENCES CITED

The following references are of record in the file of this patent:

UNITED STATES PATENTS

| Number | Name | Date |
|---|---|---|
| 312,459 | Goodhart | Feb. 17, 1885 |
| 1,534,624 | Weidlich | Apr. 21, 1925 |
| 1,806,646 | Robinson | May 26, 1931 |
| 1,992,684 | Weinberger | Feb. 26, 1935 |
| 2,333,124 | Robertson et al. | Nov. 2, 1943 |
| 2,369,900 | Jennings et al. | Feb. 20, 1945 |